(12) United States Patent
Aspler et al.

(10) Patent No.: US 10,195,888 B2
(45) Date of Patent: Feb. 5, 2019

(54) PRINT QUALITY ON THIN COATINGS OF CELLULOSE NANOCRYSTALS

(71) Applicant: FPInnovations, Pointe-Claire (CA)

(72) Inventors: Joseph Stephen Aspler, Kirkland (CA); Xuejun Zou, Dollard-des-Ormeaux (CA); Makhlouf Laleg, Pointe-Claire (CA); Tony Manfred, Dollard-des-Ormeaux (CA); Joelle Grenon, St-Eustache (CA)

(73) Assignee: FPInnovations, St-Jean Pointe-Claire QC (CA)

( * ) Notice: Subject to any disclaimer, the term of this patent is extended or adjusted under 35 U.S.C. 154(b) by 88 days.

(21) Appl. No.: 15/309,666

(22) PCT Filed: May 5, 2015

(86) PCT No.: PCT/CA2015/050389
§ 371 (c)(1),
(2) Date: Nov. 8, 2016

(87) PCT Pub. No.: WO2015/168784
PCT Pub. Date: Nov. 12, 2015

(65) Prior Publication Data
US 2017/0267009 A1    Sep. 21, 2017

Related U.S. Application Data

(60) Provisional application No. 61/991,042, filed on May 9, 2014.

(51) Int. Cl.
*B41M 5/52* (2006.01)
*D21H 11/18* (2006.01)
(Continued)

(52) U.S. Cl.
CPC ............ *B41M 5/5236* (2013.01); *B41M 5/52* (2013.01); *B41M 5/5254* (2013.01);
(Continued)

(58) Field of Classification Search
CPC .... B41M 5/52; B41M 5/5236; B41M 5/5254; D21H 11/18; D21H 19/14; D21H 19/12; D21H 21/52; C09D 101/02; B82Y 30/00
(Continued)

(56) References Cited

U.S. PATENT DOCUMENTS 4,474,850 A    10/1984    Burwasser
4,547,405 A    10/1985    Bedell et al.
(Continued)

FOREIGN PATENT DOCUMENTS

WO    2010124378    11/2010
WO    2012150383    11/2012
(Continued)

OTHER PUBLICATIONS

Supplementary European Search Report dated Dec. 19, 2017 from corresponding EP 15789566.5.
(Continued)

*Primary Examiner* — William K Cheung
(74) *Attorney, Agent, or Firm* — Norton Rose Fulbright Canada

(57) ABSTRACT

The present invention relates to the use of cellulose nanocrystals (CNC) blended with a polymeric material selected from a polyvinyl alcohol) (PVOH), an ethylene acrylic acid copolymer (EAA), other carboxylated polymer latexes, or other polymer blends, and applied as a thin coating layer on plastic films for printing with digital processes such as inkjet and laser printing, as well as with more conventional printing processes such as flexography and offset lithography, to the control of ink adhesion to the plastic film, and to the
(Continued)

reduction in the oxygen transmission rate (OTR) of the plastic film.

7 Claims, 10 Drawing Sheets

(51) Int. Cl.
| | | |
|---|---|---|
| *D21H 21/52* | (2006.01) | |
| *C09D 101/02* | (2006.01) | |
| *D21H 19/12* | (2006.01) | |
| *D21H 19/14* | (2006.01) | |
| *B82Y 30/00* | (2011.01) | |

(52) U.S. Cl.
CPC ........... *C09D 101/02* (2013.01); *D21H 11/18* (2013.01); *D21H 19/12* (2013.01); *D21H 19/14* (2013.01); *D21H 21/52* (2013.01); *B82Y 30/00* (2013.01)

(58) Field of Classification Search
USPC .......................................................... 524/35
See application file for complete search history.

(56) References Cited

U.S. PATENT DOCUMENTS

| | | |
|---|---|---|
| 5,126,194 A | 6/1992 | Light |
| 2012/0009365 A1 | 1/2012 | Simpson et al. |
| 2015/0140237 A1* | 5/2015 | Schmidt ............... B41M 5/5236 428/32.34 |

FOREIGN PATENT DOCUMENTS

| | | |
|---|---|---|
| WO | 2013060934 | 5/2013 |
| WO | 2013186367 | 12/2013 |
| WO | 2014044870 | 3/2014 |
| WO | 2011112618 | 9/2015 |

OTHER PUBLICATIONS

Hamada, H. and Bousfield, D.W., Nano-fibrillated cellulose as a coating agent to improve print quality on synthetic fiber sheet, 11th TAPPI Advanced Coating Fundamentals Symposium, Munich, Oct. 2010.
Hamada, H., Beckvermit, J., and Bousfield, D.W., Nanofibrillated Cellulose with Fine Clay as a Coating Agent to Improve Print Quality, Paper presented at Papercon 2010, Tappi Press Atlanta 2010.
Zou, X. Production of nanocrystalline cellulose and its potential applications in specialty papers, Presented at Specialty Papers 2010, Chicago, Nov. 10-11, 2010. PIRA, Leatherhead, UK.
http://www.surface-tension.de/solid-surface-energy.htm; accessed Sep. 28, 2011.
http://www.rubtester.com/index.html, Accessed Nov. 4, 2011.
Skowronski, J. and Bichard, W., Fiber-to-Fiber Bonds in Paper. (1). Measurement of Bond Strength and Specific Bond Strength, J. Pulp Paper Sci. 13:J165 (1987).
Aspler, J.S., Newsprint requirements for water-based flexography, Part III: Influence of newsprint properties on flexo ink holdout, J. Pulp Paper Sci. 14:J66 (1988).
PCT International Search Report from corresponding PCT/CA2015/050389 filed May 5, 2015.
http://www.census.gov/, accessed Apr. 27, 2011.

* cited by examiner

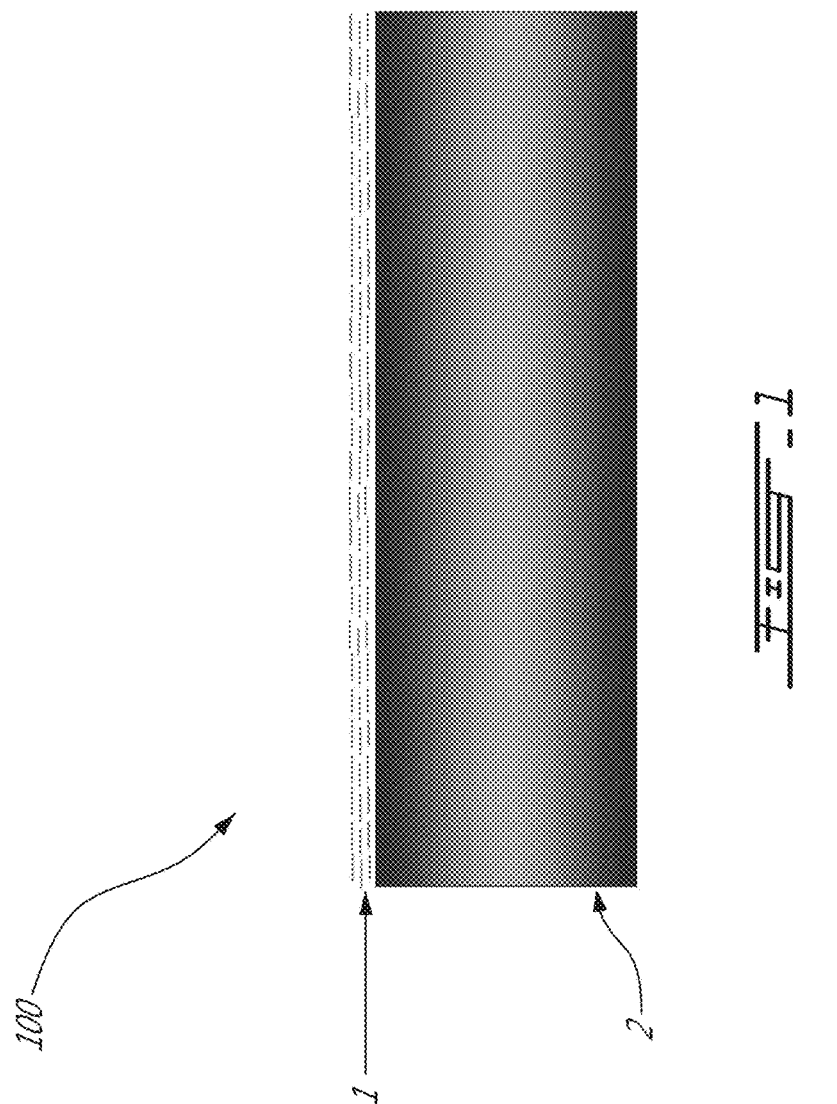

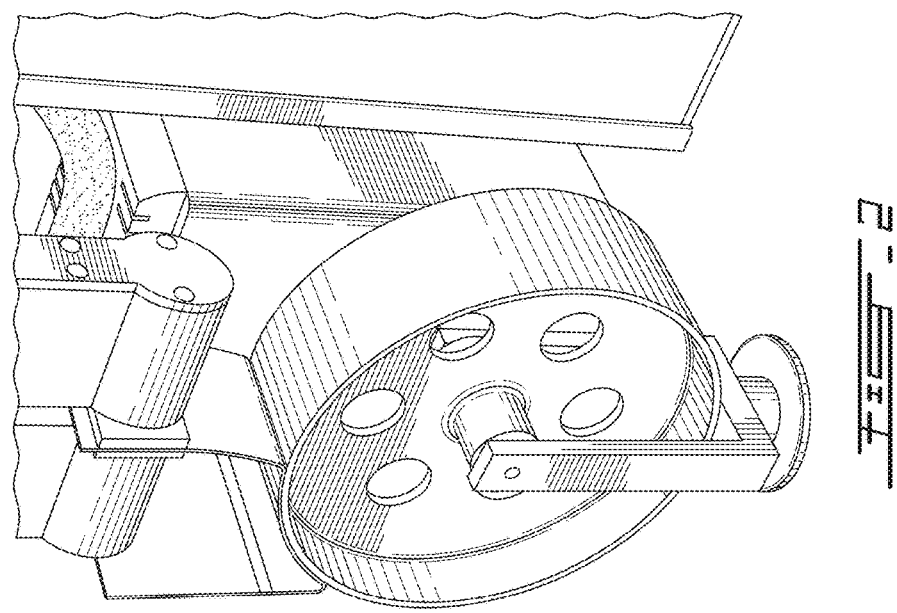

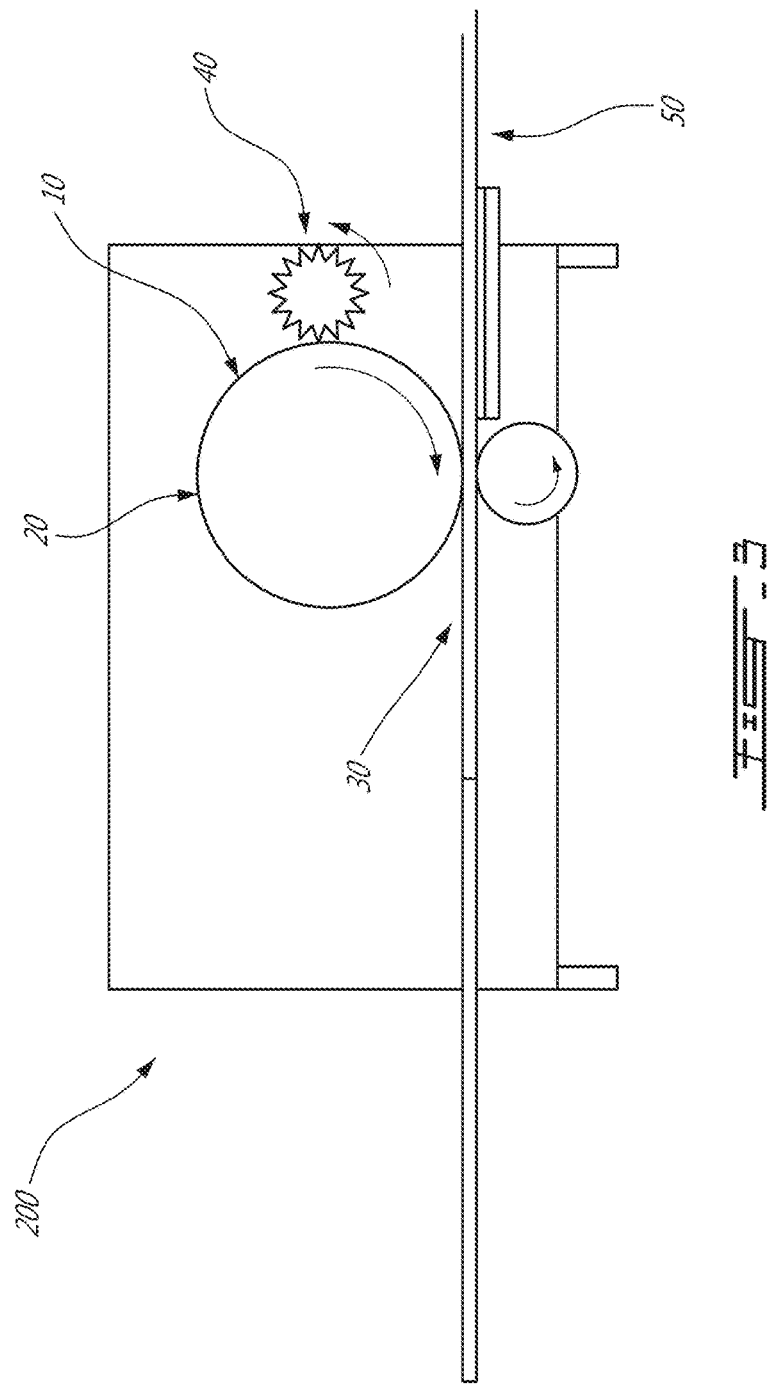

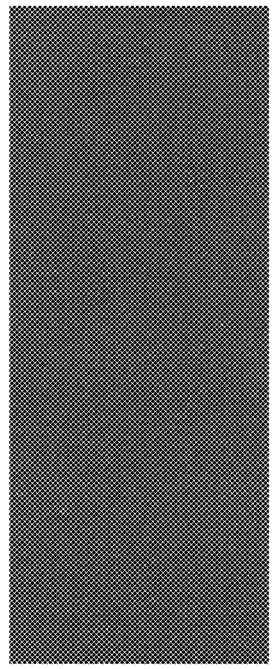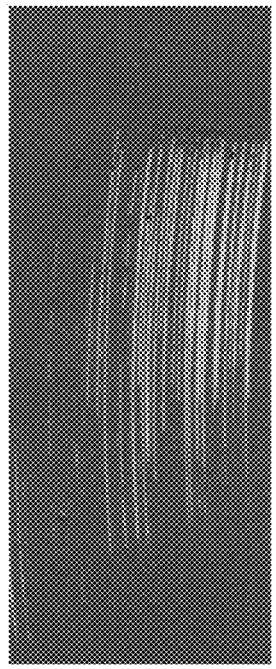
FIG. 7A
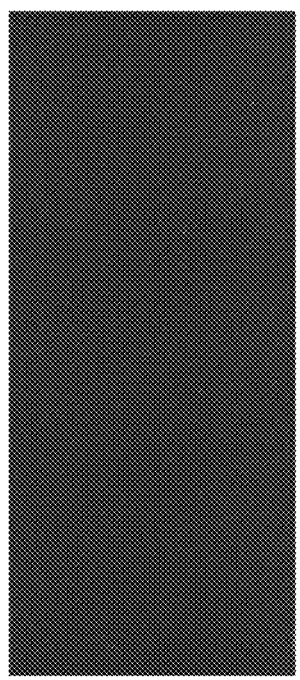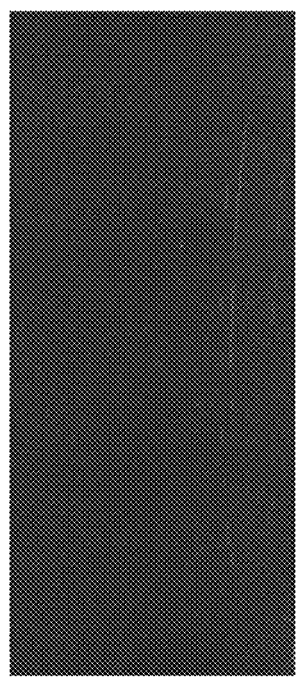
FIG. 7B

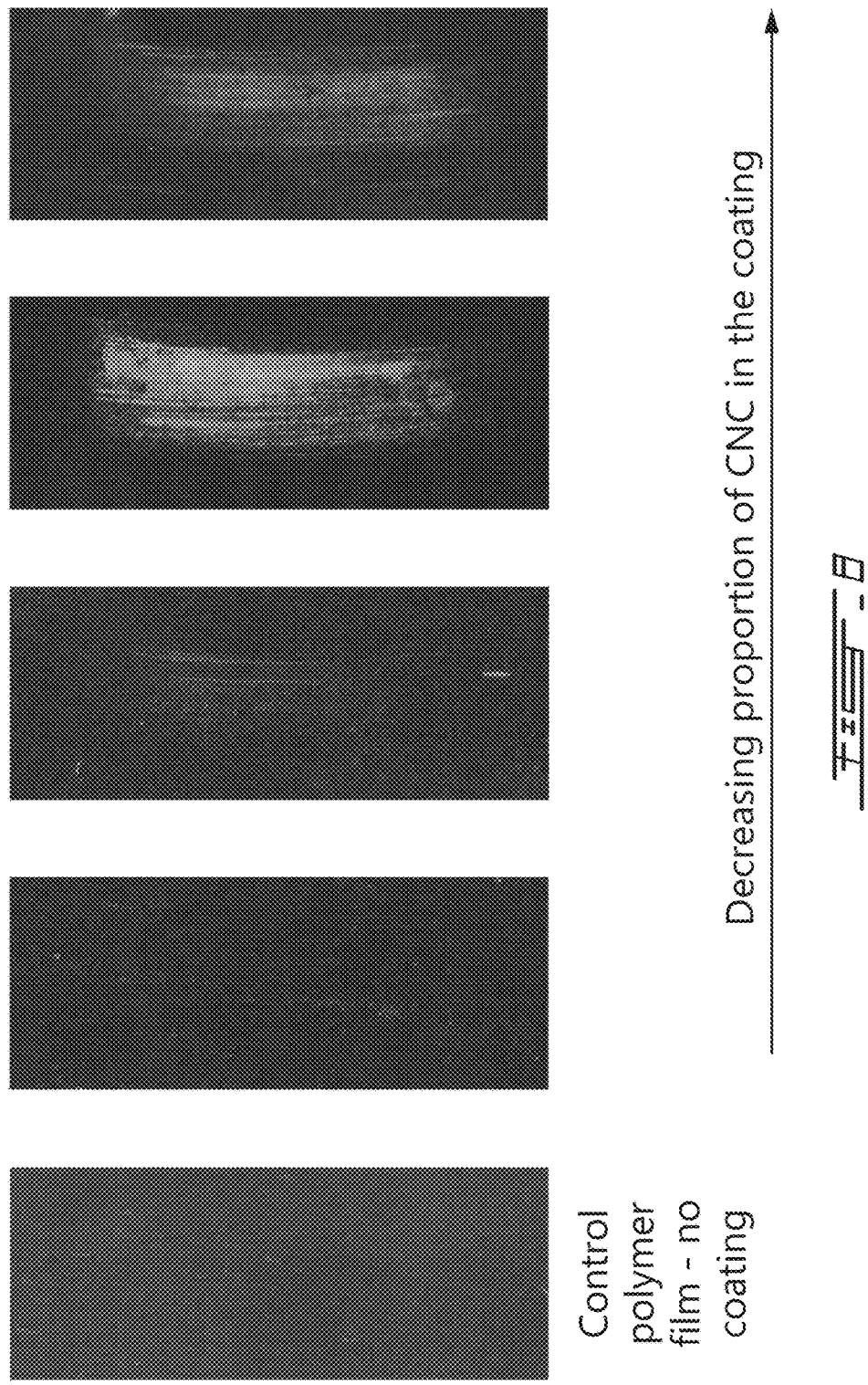

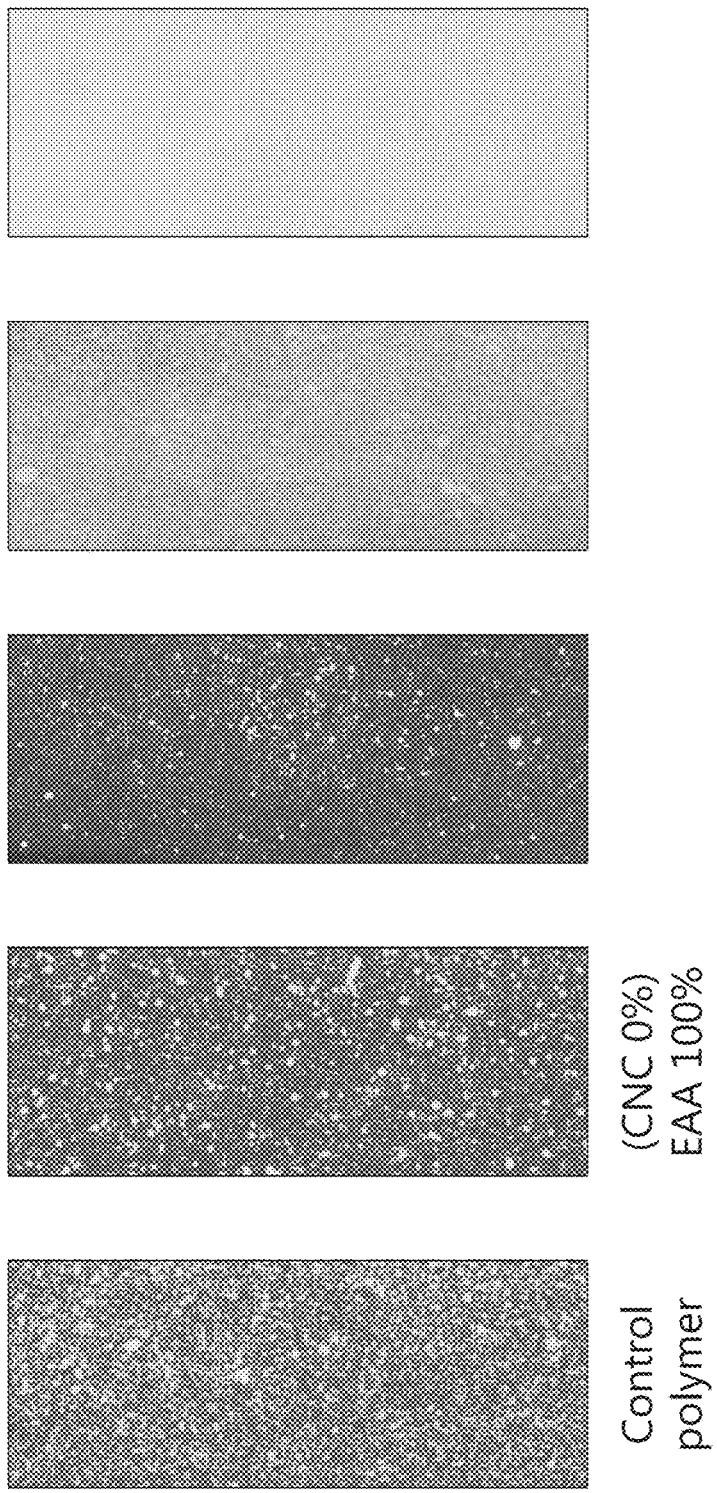

PRINT QUALITY ON THIN COATINGS OF CELLULOSE NANOCRYSTALS

CROSS-REFERENCE TO RELATED APPLICATIONS

This application is a National Phase entry of PCT/CA2015/050389 filed May 5, 2015, in which the United States of America was designated and elected, and which remains pending in the International phase until Nov. 9, 2016, which application in turn claims priority under 35 USC 119(e) from U.S. Provisional Application Ser. No. 61/991,042 filed May 9, 2014.

BACKGROUND OF THE INVENTION

Field of the Invention

The field of the invention relates to the improvement of image quality and ink adhesion on polymer films, particularly with water-based printing inks.

Description of the Prior Art

Digital printing—particularly inkjet and laser printing—is the fastest growing area of the printing market. While conventional printing processes such as offset lithography, rotogravure, and flexography are at present growing at the rate of (at most) 1% per year, digital printing is growing at the rate of more than 7% per year.
Advantages of digital printing over "conventional" printing processes include:
1. The ability to produce high quality but low volume products more economically than traditional printing processes.
2. The ability to produce personalized products by "Variable Data Printing" (VDP). Using VDP, each item in a print run can be varied to suit each customer, if desired.

Printing on plastic films and metal or metalized foils is a key part of the printing and packaging markets. These products are used as packaging, outdoor display, or as personalized information-carrying cards (drivers' licenses, credit cards, debit cards, etc.).

The plastic film industry is vast, comprising many end-uses (packaging, display, laminates, and others). According to the 2007 Economic Census released by the U.S. Census Bureau, the plastic bag and pouch industry (2007 NAICS code 326111) consumed more than $3 billion (US) of raw materials. A similar amount of raw material was consumed by other areas of plastic film usage (2007 NAICS code 326112). At a conservative estimate of $2/kg for raw materials, this shows that several million tonnes at least of raw plastics are used by the plastic film and sheet industry in the US alone.

Printing with water-based flexographic inks on smooth, impermeable materials such as polymer films presents a challenge. In particular, increasing environmental pressures on printers will force the greater use of water-based inks. However, printing with water-based inks presents serious problems on non-porous and frequently water-repellent polymers. Water-based inks will transfer and spread unevenly on such surfaces. Furthermore, ink adhesion to such surfaces is frequently poor. For this reason, pre-treatment of polymer surfaces with a high voltage electrical corona is commonplace before printing and converting. However, digital print quality—particularly water-based inkjet print quality—is poor on corona treated polymer film.

The Prior Art contains several examples of nanofibrillated cellulose (NFC) as a component of conventional paper coatings. For example, Hamada and Bousfield coated papers with different amounts of NFC, followed by printing with water-based flexographic inks, and with water-based ink jet inks (both dye-based and pigmented). The visual quality of pigmented inks was greatly improved. In a related study, Hamada et al. combined prepared heavier coatings in which NFC acted either as coating pigment (preponderance of NFC in the coating), or as coating binder (preponderance of clay blended with a small amount of NFC). NFC as binder in a clay coating did greatly improve the ink holdout, but there was no advantage of the NFC over the much less expensive polyvinyl alcohol) binder.

Zou also showed that solid CNC films (thickness of approximately 100 μm) can be printed by inkjet printing, and give superior print quality to specialty silica coated inkjet papers.

The Prior Art does contain many examples of patents in the narrow field of coatings specifically for the inkjet printing of plastic transparencies for overhead projectors. In general, the coatings described in such patents depend on water-receptive polymers sometimes combined with small amounts of filler. Nevertheless, no publications or patents have been found covering the topic of printing of film coatings containing cellulose nanocrystals coated onto polymer substrates.

The Prior Art contains many examples of patents in which soluble cellulosic derivatives such as methyl cellulose, hydroxypropyl cellulose, and others are used as film forming polymers for coatings. A recent patent described the addition of "oligofructose fibers" (i.e., soluble cellulose dietary fiber material such as inulin) to these coatings, possibly as reinforcing agents.

Plastic packaging materials for food require resistance to penetration of both water vapour and oxygen gas. It is well-known in the Prior Art that polymers such as polyethylene and polypropylene provide good protection against water vapour, but poor protection against oxygen gas. Conversely, it is also well-known that cellulosic films provide good protection against oxygen gas but poor protection against water vapour.

SUMMARY OF THE INVENTION

The object of this concept disclosure is to provide an improved recording medium for digital printing, particularly by the inkjet and laser printing, as well as for the flexographic (flexo) and other printing processes as well. This is achieved by means of applying thin coatings of cellulose nanocrystals (CNC) blended with polyvinyl alcohol) (PVOH) or other polymeric materials onto polymer films, to help trap the ink, to prevent the ink from spreading and bleeding on the polymer film surface, and to improve the ink adhesion. The hydrophilic nature of CNC and the high surface area and small pores of CNC film create a substrate layer to provide a fast ink setting while retaining the ink dye or pigments on the surface. Controlled adhesion of the ink/toner and of the CNC to the polymer film is achieved by blending polyvinyl alcohol (PVOH), ethylene vinyl acetate copolymer (EAA) or carboxylated latexes with the CNC, and by pre-treating the polymer film with an electrical corona discharge before coating with CNC. In particular, adhesion of the ink film in the presence of water is achieved by substituting ethylene vinyl acetate copolymer (EAA) or carboxylated latexes for the PVOH in the blend. A higher ratio of CNC to EAA gives faster ink drying, but poorer ink wet rub resistance. A lower ratio of CNC to EAA gives slower ink drying, but better ink wet rub resistance. Therefore, ink drying rate vs. wet rub resistance can be balanced according to customer need by varying the ratio of CNC to EAA in the coating. Thin coatings of CNC/polymer blends are also effective at reducing the oxygen transmission rate (OTR) through plastic films. Although the coatings described in this work were applied by hand, the materials are fully compatible with industrial coating equipment.

In accordance with one aspect of the present invention, there is provided a polymer recording medium for digital printing, at least one layer of a coating on the medium, the coating comprising a cellulose nanocrystals (CNC), and a polymeric material compatible with CNC.

In accordance with another aspect of the present invention, there is provided the recording medium herein described, wherein the polymeric material is selected from a polyvinyl alcohol, an ethylene vinyl acetate (EVA) copolymer, an ethylene acrylic acid (EAA) copolymer, a carboxylated latex and combinations thereof.

In accordance with another aspect of the present invention, there is provided the recording medium herein described, wherein the coating has a weight ratio of polymeric material (PM) to CNC is from 0.1% to 95.0% PM/CNC.

In accordance with another aspect of the present invention, there is provided the recording medium herein described, wherein the coating has a weight ratio of polymeric material (PM) to CNC is from 20% to 80% PM/CNC.

In accordance with another aspect of the present invention, there is provided a coating composition for a polymer recording medium, the coating comprising a cellulose nanocrystals (CNC), and a polymeric material compatible with CNC.

In accordance with another aspect of the present invention, there is provided the composition herein described, wherein the polymeric material is selected from a polyvinyl alcohol, an ethylene vinyl acetate (EVA) copolymer, an ethylene acrylic acid (EAA) copolymer, a carboxylated latex and combinations thereof.

In accordance with another aspect of the present invention, there is provided the composition herein described, wherein the coating has a weight ratio of polymeric material (PM) to CNC is from 0.1% to 95.0% PM/CNC.

In accordance with another aspect of the present invention, there is provided the composition herein described, wherein the coating has a weight ratio of polymeric material (PM) to CNC is from 20% to 80% PM/CNC.

In accordance with another aspect of the present invention, there is provided a method of producing a polymer recording medium for digital printing comprising preparing an aqueous suspension comprising a cellulose nanocrystals (CNC), and a polymeric material compatible with CNC. providing the recording medium; treating the medium in a corona discharge; preparing a suspension of a cellulose nanocrystals (CNC), and a polymeric material compatible with CNC, and applying at least one layer of the suspension onto the medium.

In accordance with another aspect of the present invention, there is provided the method herein described, wherein the polymeric material is selected from a polyvinyl alcohol, an ethylene vinyl acetate (EVA) copolymer, an ethylene acrylic acid (EAA) copolymer, a carboxylated latex and combinations thereof.

In accordance with another aspect of the present invention, there is provided the recording medium herein described, wherein the coating has a weight ratio of polymeric material (PM) to CNC is from 0.1% to 95.0% PM/CNC.

In accordance with another aspect of the present invention, there is provided the method herein described, wherein the coating has a weight ratio of polymeric material (PM) to CNC is from 20% to 80% PM/CNC.

In accordance with another aspect of the present invention, there is provided the method herein described, wherein the corona discharge is in a range from 5 to 25 W min/m$^2$.

DESCRIPTION OF THE DRAWINGS

FIG. 1 illustrates a schematic representation of the fundamental concept of a thin CNC coating on a plastic film, according to one embodiment of the present invention;

FIG. 2 illustrates a test setup for ink peel measurement on the Instron device used, according to one embodiment of the present invention;

FIG. 3 illustrates a test setup for ink drying (ink setoff) test on the IGT F1 laboratory flexographic press, according to one embodiment of the present invention; in which ink is applied to the CNC-coated plastic film, followed by transfer of the remaining wet ink to a reference paper;

FIG. 7A illustrates flexographic prints made with a water-based ink formulated specifically for plastic films, on untreated PET film of the prior art. The images were taken before (left side) and after (right side) testing for dry rub resistance as compared to FIG. 7A;

FIG. 7B illustrates flexographic prints made with a water-based ink formulated specifically for plastic films on PET film coated with blend of CNC with PVOH, according to one embodiment of the present invention showing an improvement in water-based flexographic print density and the reduction in ink ruboff on an CNC coating, where the superiority in print density (blackness) and in rub resistance are both clearly evident;

FIG. 8 illustrates that wet rub resistance of flexographic ink can be controlled by varying the ratio of CNC to EAA polymer, where for higher amounts of CNC in the coating (left), the amount of ink removed by the wet rub test is minimal, and the amount of ink removed by the wet rub test increases with decreasing CNC content in the film;

FIG. 9 illustrates an improvement in water-based flexographic ink setting (measured as ink setoff) with increased amounts of CNC in the coating, where the setting of water-based flexographic ink is poor on the control polymer film and on a coating of pure EAA (left), a higher CNC content in the coating gives faster ink setting (from left to right in the images);

DETAILED DESCRIPTION OF THE INVENTION

Figure 4A:
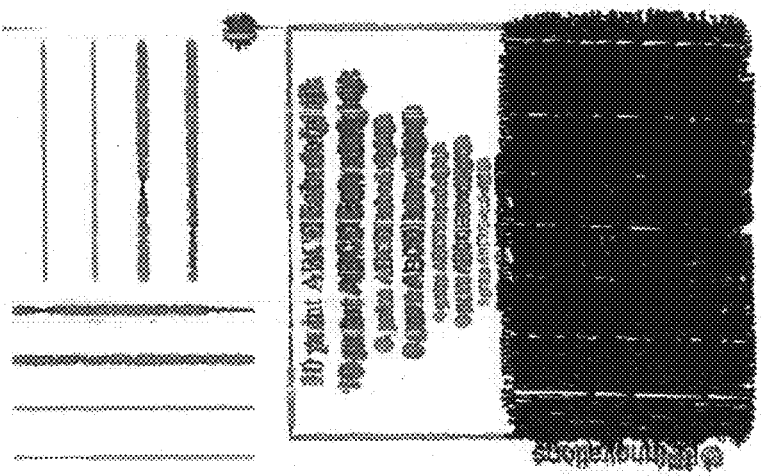
FIG. 4A illustrates an inkjet test pattern of very poor visual quality on untreated PET film.

The present invention is aimed at improving the print quality and the adhesion of printing inks and digital inks to plastic films. Print quality is defined in terms of improved colour reproduction, greater print density (i.e., a "blacker" black print), more uniform printed areas, better definition (less raggedness) of lines and printed characters, and improved ink adhesion. The fundamental concept of a polymer recording medium 100 for digital printing including a thin coating 1 of CNC on a flexible plastic film 2 is shown in FIG. 1.

As already stated, digital printing processes are the fastest growing processes today. However, while traditional "conventional" printing processes such as offset, rotogravure (gravure), and flexo are growing very slowly (if at all), they still dominate both publication and package printing.

In general, flexo is the process of choice for low/medium quality package printing, offset is the process for medium/high quality package printing, and gravure is the process of choice for high quality package printing, especially when a long production run is required. Since water-based rotogravure inks are chemically similar to water-based flexo inks, we will use only water-based flexo inks as examples of this class of water-based printing inks.

Problems with water-based inkjet inks in general include
  Poor resolution of lines and printed characters due to the spreading of the ink beyond its nominal size and position (known as 'line spreading".)
  Colour-to-colour bleeding, in which one wet ink colour "bleeds" or mixes into another wet ink printed in close proximity (known as "bleeding")
  Poor ink adhesion The present invention has been evaluated on three different types of polymer films. The three polymers were chosen as they cover a wide range in both cost and (of importance for this invention) a wide range of surface free energy. The surface free energy of a material is a measure of its ability to be wet by water and other fluids. A higher surface free energy is more easily wet by water. An example of this is a clean glass surface. A lower surface free energy is more difficult to wet by water. An example of this is a wax paper or other water-repellent material.

The three polymers and their surface free energies are:
  PET (polyethylene terephthalate), sold under many trade names such as Mylar™—surface free energy of approximately 45 mN/m
  Polystyrene—surface free energy of approximately 41 mN/m
  Polyethylene—surface free energy of approximately 35 mN/m Water based inks have the advantages of being cheaper and more environmentally friendly than solvent-based inks. Although water-based flexo inks have supplanted solvent-based inks on paper-based packaging, solvent-based inks are still important in the printing of plastic films. The reason is that for many applications, water-based inks on plastic films cannot match the print quality or the drying rate of solvent-based inks, particularly for multi-colour process printing.

Plastic films (with and without thin CNC coatings) were printed with water-based and solvent-based black flexo inks specifically formulated for use on plastic films.

Plastic films (with and without thin CNC coatings) were printed with water-based inkjet inks on desktop printers made by different equipment manufacturers.

Print density or print optical density is a measure of the darkness of an ink film. For a black ink film, a higher print density indicates a "blacker" film. For commercial printing, print densities of at least 1.2 and as high as 1.7 are desirable, depending on the requirements of the particular print job. Printed ink films must also be resistant to removal, for example, by rubbing, by peeling, and by other actions.

Print quality was determined in terms of the optical print density of the black inks.

The resistance of the printed ink films to rub was measured using a Sutherland ink rub tester, U.S. Pat. No. 2,734,375, Canadian Pat. 532,864, manufactured by the Brown Company, Kalamazoo, Mich.

The resistance of the printed ink films to rub in the presence of water ("wet rub Resistance") as measured as above, after the addition of 0.07 mL of water to the surface of the print.

The resistance of the printed ink films to peel (i.e., ink removal by forces perpendicular to the printed surface) was determined by the technique described by Skowronski and Bichard, using the Instron 5867 Tester. The basic illustration of a peel test measurement schematic is presented in FIG. 2.

The drying of freshly-printed flexo ink was measured as the setoff of the wet ink film onto a reference paper. The schematic of the setoff test 200 is shown in FIG. 3 in which ink is applied to the CNC-coated plastic film, followed by transfer of the remaining wet ink to a reference paper. The greater the amount of ink set off onto the reference paper, the slower the ink drying.

The setoff includes an engraved anilox roll 10 that prints ink directly onto the CNC-coated film. At position 20, CNC-coated plastic film receives ink, and wet ink may remain on the CNC-coated plastic film. As the roll 10 rotates it transfers this remaining wet ink from the CNC-coating to the reference paper as a measure of ink drying at position 30. In a preferred embodiment, the setoff test 200 apparatus also includes a corona discharge 40, adjacent the engraved anilox roll 10, where the CNC plastic film can be treated.

The rate of transmission of oxygen gas through the coated and uncoated plastic films was measured on the OpTech O2 Platinum instrument, made by Mocon Inc., Minneapolis, Minn., USA. Measurements were made at a temperature of 23° C. and a relative humidity of 50%.

Typical Procedure to Prepare CNC-Based Coatings

Typically, one starts with an aqueous stock suspension of approximately 4% (by weight) of CNC. A concentrated (approximately 30% by weight) solution of polyvinyl alcohol) is added dropwise until the final proportion of 9 parts (by weight) of CNC and 1 part (by weight) of PVOH is reached. Sodium sulfate is added to achieve a concentration of 0.005 molar $Na_2SO_4$. The mixture is then dispersed for several hours until uniform. The addition of a small amount of sodium sulfate is useful for viscosity control, but is not an essential part of the invention.

Both CNC in its acidic form (suspension pH of approximately 2.5) and its neutralized form (pH approximately 6.5) were used. Unless otherwise noted, in this document, the neutralized form is referred to.

Typical Procedure to Apply a Thin Coating of CNC Onto a Polymer Film Surface

Immediately before coating, a sheet of PET or other polymer film is treated under a commercial corona discharge, typically (although not exclusively) within the range 5 to 25 W·min/m$^2$. In this document, "corona", "corona treatment" or "corona power" are always understood as being given in units of W·min/m$^2$.

The corona-treated polymer sheet is immediately taped to a uniform glass sheet. The CNC/PVOH mixture was is distributed on the Mylar™ film using a drawdown "bird" or blade suitable to give a dry coat weight of approximately 3 g/m$^2$.

CNC coatings were made containing PVOH in the ratio of 0.1% to 95% by weight of PVOH in the coating. CNC coatings were also made in the ratio of 20 parts by weight of CNC with 80 parts of ethylene acrylic acid copolymer or 80 parts of latex polymer; in the ratio of 20 parts by weight of CNC with 40 parts of ethylene acrylic acid copolymer and 40 parts of PVOH; and in the ratio of 20 parts by weight of CNC with 40 parts of latex polymer and 40 parts of PVOH.

EXAMPLES

Example 1—Improved Inkjet Print Quality by Means of a Thin Coating of CNC

Figure 4B:
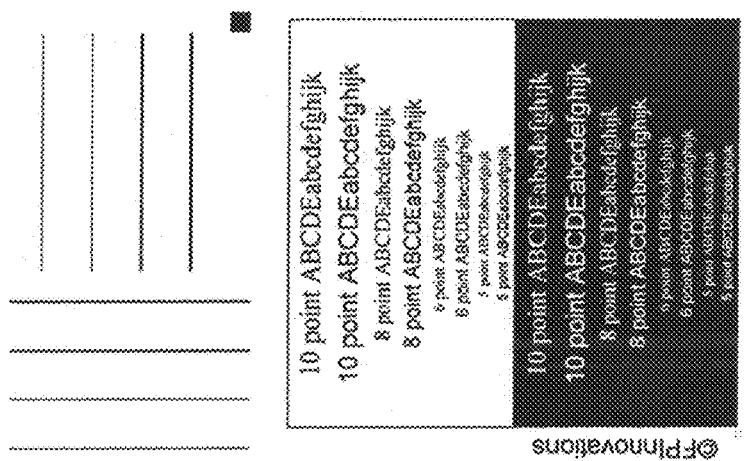
FIG. 4B illustrates a superior visual quality of the same test pattern on PET film coated with a blend of CNC with PVOH, according to one embodiment of the present invention.

A coating containing 90% by weight of CNC and 10% by weight of polyvinyl alcohol) (PVOH) was applied to a sheet of PET film. FIG. 4A shows that the image quality is very poor when an inkjet test image is printed on the untreated PET film. In particular, on the uncoated PET surface, lines have spread to an unacceptable extent, and the text resolution is extremely poor. FIG. 4B shows the large improvement in image quality when the same test image is printed by inkjet on the PET film coated with a thin film of CNC.

Figure 5B:
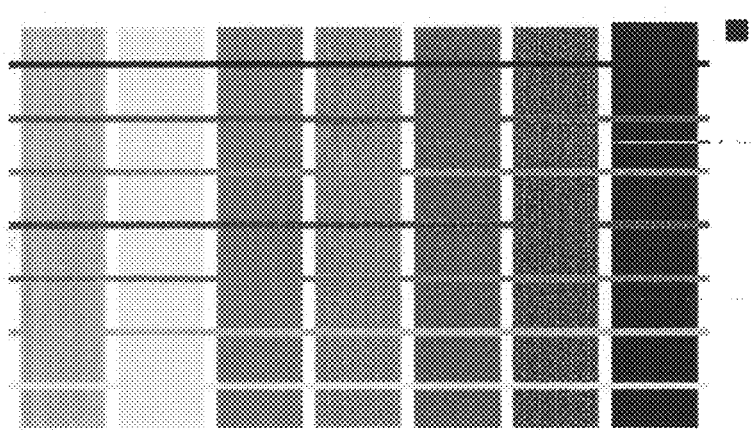
FIG. 5B illustrates an inkjet print on PET film coated with a blend of CNC with PVOH, according to one embodiment of the present invention showing a reduction in bleeding (original images in colour) of liquid inkjet inks onto an CNC coating, printed using inkjet printer A.
Figure 5A:
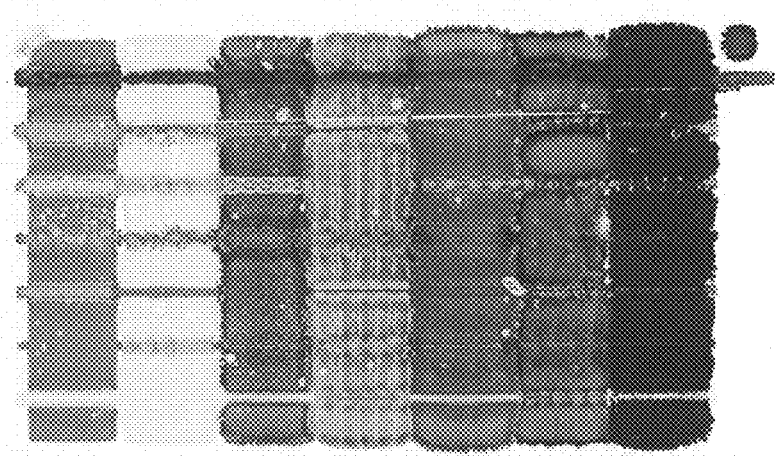
FIG. 5A illustrates an inkjet print on untreated PET film of the prior art.
Figure 6A:
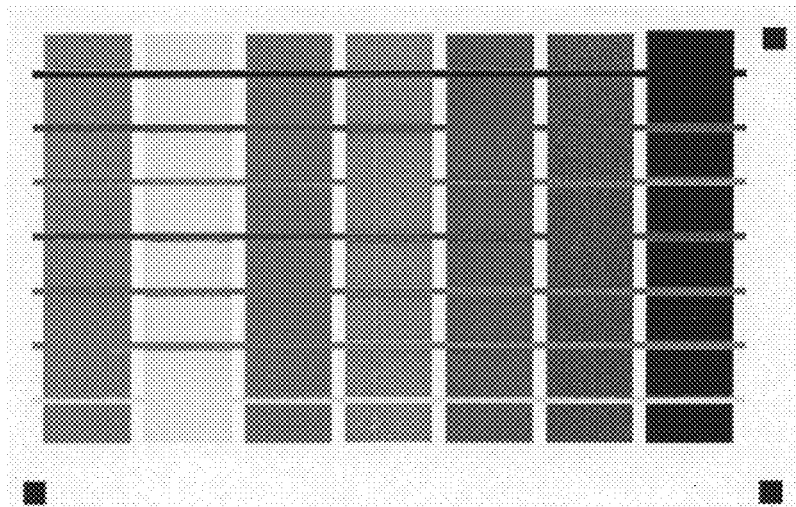
FIG. 6A illustrates a print on untreated PET film of the prior art.
Figure 6B:
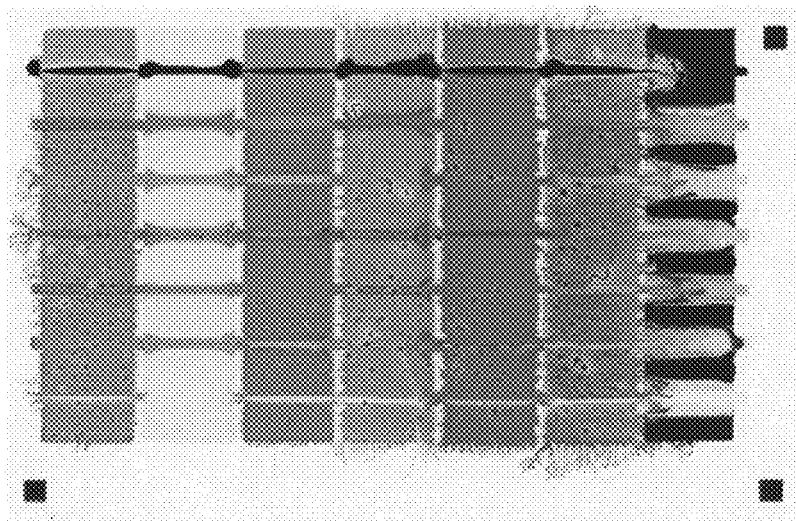
FIG. 6B illustrates a print on PET film coated with a blend of CNC with PVOH, according to one embodiment of the present invention, showing a reduction in bleeding (original images in colour) of liquid inkjet inks onto an CNC coating, printed using inkjet printer B.

FIG. 5 and FIG. 6 show the reduction in the amount of ink bleeding in multi-colour inkjet printing after applying the thin CNC coating. Specifically, FIG. 5A illustrates the poor quality of water-based inkjet printing of untreated PET film. FIG. 5B illustrates the far superior quality of printing of the same inkjet printer on a PET film coated with CNC and PVOH. Similarly, FIG. 6A illustrates printing by a second type of inkjet printer on untreated PET which also results in poor quality. FIG. 6B illustrates the dramatic improvement with the second inkjet printer when a film of PET coated with CNC and PVOH is used. We note that the original images are multi-coloured, and have been converted to monochrome images in this document. Thus, inkjet printers from different manufacturers give different—and still poor—image quality on the plain untreated plastic films, but in all cases, the image quality is greatly improved with all printers that were used in printing on a thin coating of CNC.

Example 2—Improvement of Inkjet Line Quality on PET Film by Means of a Thin CNC Coating Vertical and horizontal lines of nominal 0.4 mm thickness were printed on a commercial inkjet transparency film, on pure PET film, and on pure PET film that had been treated with corona power of 10 immediately before printing. The same lines were also printed onto PET that had been coated by a mixture of CNC/PVOH immediately after corona treatment.

Visual examples have already been provided in FIGS. 4, 5, and 6.

As shown in Table 1, the line width on the commercial inkjet transparency film was close to the nominal width of 0.4 mm, and the raggedness of the line was minimal. The line width on the control untreated PET films was nearly triple the nominal value, and the line raggedness was severe. In contrast, the line width on the PET films that had received a thin coating of CNC/PVOH were all close to the nominal value, and the line raggedness was minimal. We note that the degree of line broadening may depend upon the chemistry of the inkjet ink that is used.

TABLE 1

Improvement in the quality of solid lines printed by inkjet on PET films

| | Nominal 0.4 mm vertical line width | Nominal 0.4 mm vertical line raggedness Lower is better | Nominal 0.4 mm horizontal line width | Nominal 0.4 mm horizontal line raggedness Lower is better |
|---|---|---|---|---|
| Control samples | | | | |
| Commercial ink jet transparency film (control) | 0.42 ± 0.01 | 0.007 | 0.39 ± 0.01 | 0.007 |
| PET film as received (control) | 1.09 ± 0.22 | 0.130 | 1.18 ± 0.24 | 0.143 |
| PET film, after 10 power corona treatment | 1.04 ± 0.17 | 0.092 | 1.29 ± 0.20 | 0.133 |
| PET sheets treated by corona discharge and coated with NCC/PVOH mixture | | | | |
| 25% PVOH 10 power corona treatment | 0.38 ± 0.01 | 0.010 | 0.40 ± 0.02 | 0.009 |

Example 3—Reduction of Colour-To-Colour Bleeding in Inkjet Printing on PET Sheets By Means of a Thin Coating of CNC The degree of undesirable colour-to-colour bleeding was greatly reduced on a thin coating of CNC/PVOH on PET sheets compared to untreated PET alone, as shown quantitatively in Table 2. Visual examples have already been presented in FIGS. 5 and 6.

TABLE 2

Reduction in liquid ink to ink bleeding in inkjet printing on PET sheets

| | Inkjet bleeding of black ink on yellow ink. Lower is better | Ink jet black line width in mm, printed on a yellow background. Lower is better. |
|---|---|---|
| Control samples | | |
| PET film as received | 1.97 ± 0.42 | 2.65 ± 0.45 |
| PET film, after 10 power corona with corona treatment | 2.20 ± 0.10 | 2.87 ± 0.26 |

TABLE 2-continued

Reduction in liquid ink to ink bleeding in inkjet printing on PET sheets

|  | Inkjet bleeding of black ink on yellow ink. Lower is better. | Ink jet black line width in mm, printed on a yellow background. Lower is better. |
|---|---|---|
| PET sheets treated by corona discharge and coated with CNC/PVOH mixture with the amount of PVOH as shown below | | |
| PET film coated with 25% PVOH/75% CNC, 10 power corona pre-treatment | 0.037 ± 0.001 | 0.872 ± 0.008 |

Example 4—Reduction of Colour-to-Colour Bleeding in Inkjet Printing on Polyethylene and Polystyrene Sheets by Means of a Thin Coating of CNC As shown in Table 3, undesirable colour to colour bleeding in inkjet printing on polyethylene and polystyrene films is greatly reduced by the presence of a thin coating of CNC. Visual examples have already been provided in FIGS. 5 and 6. The improvement is somewhat better on coatings made from acidic CNC compared to sodium CNC.

TABLE 3

Reduction in liquid ink to ink bleeding in inkjet printing on polyethylene and polystyrene films

|  | Inkjet bleeding of black ink on yellow ink. Lower is better | Standard deviation of width of black line on yellow. Lower is better |
|---|---|---|
| Polyethylene | | |
| Polyethylene film after 10 power treatment with corona | 3.13 ± 1.4 | 0.32 |
| Polyethylene film coated with 20% PVOH/80% neutral-form CNC after 10 power pre-treatment with corona | 1.38 ± 0.50 | 0.04 |
| Polystyrene | | |
| Polystyrene film after 10 power treatment with corona | 3.84 ± .26 | 0.31 |
| Polystyrene film coated with 20% PVOH/80% neutral-form CNC after 10 power pre-treatment with corona | 0.846 ± 0.011 | 0.09 |

Example 5—Reduction in the Amount of Inkjet Ink Removed by Dry Rubbing

Ink removal by rubbing action on inkjet prints depends on the type of plastic, on the level of corona pre-treatment of the plastic before coating with CNC, and on the amount of PVOH in the CNC mixture.

For all three plastic films (PET, polyethylene, and polystyrene) the lowest amount of ink removed by dry rubbing is achieved by corona pre-treatment of 25 watts power, before coating with 20% of PVOH by weight in the CNC blend. We note in Table 4 that on the polyethylene film, corona pre-treatment alone gives a certain amount of resistance to rubbing, but without the superior print quality of the CNC coating.

TABLE 4

Ink ruboff on inkjet prints - % of ink removed by rubbing on Sutherland ink rub tester. Lower is better.

|  | PET film | Polyethylene film | Polystyrene film |
|---|---|---|---|
| Control: Film as received | 64.1 ± 9.7 | — | — |
| Control: Film after 10 power pre-treatment with corona | 58.2 ± 6.6 | 15.3 ± 2.7 | 25.8 ± 4.7 |
| Film coated with 5% PVOH/95% CNC after 10 power pre-treatment with corona | 34.4 ± 1.9 | 41.6 ± 6.1 | 18.1 ± 1.2 |
| Film coated with 20% PVOH/80% CNC after 25 power pre-treatment with corona | 6.9 ± 5.3 | 13.4 ± 4.4 | 7.8 ± 4.6 |

Example 6—Increased Ink Peel Strength Using a Coating of CNC

The ink peel strength (i.e., removal of ink by forces perpendicular to the printed surface) is greatly increased by the presence of a thin coating of CNC. As shown in Table 5, the peel strength of inkjet ink on unmodified PET plastic is poor. A small amount (0.3% by weight) of PVOH in an CNC coating increases the peel strength somewhat. A PVOH content of more than 2.5% or more by weight increases the peel strength to a maximum, beyond which there is no statistically significant benefit to additional PVOH addition.

TABLE 5

Peel strength (in $J/m^2$) of inkjet film printed onto thin CNC coatings on PET plastic film films

|  | Peel strength ($J/m^2$) Higher is better |
|---|---|
| Control: film as received | 13 ± 7 |
| Control: Film after 10 power pre-treatment with corona | 5.5 ± 1.1 |
| Film coated with 0.3% PVOH/99.7% CNC after 10 power pre-treatment with corona | 38 ± 4 |
| Film coated with 25% PVOH/75% CNC after 10 power pre-treatment with corona | 138 ± 48 |

Example 7—Improved Line Quality in Monochrome Laser Xerographic Printing

As shown in Table 6, line quality in laser xerographic printing of PET film is improved with a thin coating of CNC film compared to the uncoated PET film.

TABLE 6

Improved line quality in laser xerographic printing on PET films with a thin coating of CNC

|  | Nominal 0.4 mm vertical line width. Lower is better | Nominal 0.4 mm vertical line raggedness. Lower is better | Nominal 0.4 mm horizontal line width. Lower is better | Nominal 0.4 mm horizontal line raggedness. Lower is better |
|---|---|---|---|---|
| Control samples | | | | |
| PET film as received | 0.78 ± 0.17 | 0.092 | 0.78 ± 0.16 | 0.104 |
| PET film after pre-treatment with 10 power corona | 0.49 ± 0.12 | 0.101 | 0.48 ± 0.10 | 0.064 |
| Commercial film supplied for laser xerographic printing | 0.41 ± 0.02 | 0.009 | 0.42 ± 0.02 | 0.009 |
| PET sheets treated by corona discharge and coated with CNC/PVOH mixture with the amount of PVOH as shown below | | | | |
| PET film coated with 25% PVOH/75% CNC, 10 power corona pre-treatment | 0.39 ± 0.01 | 0.016 | 0.43 ± 0.02 | 0.016 |

Example 8—Improved Flexographic Print Quality by Means of a Thin Coating of CNC FIG. 7 shows the improvement in image quality and the reduction in ink removal by dry rubbing. FIG. 7A shows untreated PET film printed with a water-based ink formulated for plastics, before and after a dry rub test. We note that the initial image 7A is less dark (lower print density) and less uniform (more mottle) before the rub test, and that after the rub test, the image 7A shows severe abrasion/ink removal. FIG. 7B shows the PET film coated with CNC/PVOH. We note that the initial image 7B on the coated PET film before the rub test is much darker and more uniform, and that there is little sign of damage caused by the dry rub test in image 7B. Table 7 clearly sets forth the increased print density of black flexo inks printed onto thin CNC coatings on plastic films.

Example 9—Flexo Print Density is Improved by a Thin Coating of CNC

A thin coating of CNC on PET, polyethylene, and polystyrene films was printed with water-based and solvent-based flexographic inks formulated specifically for use on plastic films. The optical print density (blackness) of the printed ink film is a common measure of the print quality, and is a common quality target that printers are required to meet. Table 7 shows that on plain plastic films without CNC coatings, the optical print density of the water-based ink is inferior to the optical print density obtained with solvent-based inks. Table 7 also shows that with a thin CNC coating on the plastic surfaces, print density is greatly improved and is equivalent to the print density obtained with solvent-based ink. We further note that not only are water-based inks more environmentally friendly than solvent-based inks, but water-based are less expensive, providing another potential benefit to printers.

TABLE 7

Improvement in optical print density of black flexo inks printed onto thin CNC coatings on plastic films.

|  | Print density of water-based black ink designed for use on plastic. Higher is better. | Print density of solvent-based black ink designed for use on plastic. Higher is better. |
|---|---|---|
| PET film | | |
| PET film after 10 power treatment with corona | 0.88 ± 0.04 | 1.27 ± 0.02 |
| PET film coated with 20% PVOH/acid form CNC after 10 power pre-treatment with corona | 1.40 ± 0.03 | 1.34 ± 0.03 |
| Polyethylene film | | |
| Polyethylene film after 10 power treatment with corona | 1.03 ± 0.02 | 1.45 ± 0.05 |
| Polyethylene film coated with 20% PVOH/acid form CNC after 10 power pre-treatment with corona | 1.38 ± 0.09 | 1.36 ± 0.05 |
| Polystyrene film | | |
| Polystyrene film after 10 power treatment with corona | 0.89 ± 0.03 | 1.21 ± 0.05 |
| Polystyrene film coated with 20% PVOH80% acid form CNC after 10 power pre-treatment with corona | 1.35 ± 0.03 | 1.27 ± 0.04 |

Example 10—Lower Concentrations of CNC in the CNC/PVOH Blends

The improved dry adhesion and the improved print quality of the prints is maintained with a proportion of as little as 20 parts of CNC to 80 parts of PVOH. Other proportions may be optimal depending on the ink chemistry.

Example 11—Influence of Acid Form vs. Neutral Form of CNC

As shown in Table 8, the acid form of the CNC imparts better rub resistance to printed ink films than does the neutral form. The inks themselves are alkaline, and it is known that an acidic substrate can more easily set or immobilize an alkaline ink.

TABLE 8

Dry ink rub resistance: Acidic NCC vs neutral NCC Mylar polymer film

|  | % Black inkjet ink removed Dry rub - Lower is better | % Black flexo ink removed Dry rub - Lower is better |
|---|---|---|
| Acidic NCC | 0.5 ± 0.2 | 2.5 ± 0.2 |
| Neutral NCC | 23.9 ± 3.7 | 14 ± 1.1 |

Example 12—Dry Adhesion of Flexographic Ink as Measured in a Standard Dry Rubbing Test is Greatly Improved by the Presence of a Thin Film of CNC A thin coating of CNC on PET, polyethylene, and polystyrene films was printed with water-based and solvent-based flexographic inks formulated specifically for use on plastic films. The printed samples were rubbed in a standard dry ink rub test. The results in Table 9 show that on plain plastic films without CNC coatings, a very large percentage of the ink is removed. However, the resistance to removal of ink by rub is greatly improved when the ink is printed onto a thin coating of CNC rather than onto the plastic surface. This reduction in dry ink rub has also been illustrated in FIG. 7.

TABLE 9

Reduction in removal of flexo ink by dry rubbing action

|  | % of ink removed by dry rubbing: water-based black ink designed for use on plastic. Lower is better. | % of ink removed by dry rubbing: solvent-based black ink designed for use on plastic. Lower is better. |
|---|---|---|
| *PET film* | | |
| PET film after 10 power treatment with corona | 58.9 ± 7.3 | 34.2 ± 9.9 |
| PET film coated with 20% PVOH/acid form CNC after 10 power pre-treatment with corona | 0.4 ± 0.3 | 6.9 ± 2.4 |
| *Polyethylene film* | | |
| Polyethylene film after 10 power treatment with corona | 12.1 ± 3.5 | 25.9 ± 5.0 |
| Polyethylene film coated with 20% PVOH/acid form CNC after 10 power pre-treatment with corona | 0.1 ± 0.1 | 0.3 ± 0.1 |
| *Polystyrene film* | | |
| Polystyrene film after 10 power treatment with corona | 42.4 ± 4.8 | 14.0 ± 6.1 |
| Polystyrene film coated with 20% PVOH80% acid form CNC after 10 power pre-treatment with corona | 0.4 ± 0.3 | 1.6 ± 0.4 |

Example 13—Using a Latex Polymer to Improve Wet Rub Resistance of Printed Ink Films As shown in Table 10, the wet rub resistance of a film of 20 parts CNC and 80 parts PVOH is poor. In this Example, the substitution of 80 parts of ethylene acrylic acid copolymer in place of 80 parts of PVOH or the substitution of 80 parts of styrene-acrylonitrile latex in place of 80 parts of PVOH maintained the print density improvement and the dry rub resistance, but at the same time gave a greatly improved wet rub resistance.

TABLE 10

Improvement in print density and in dry and wet ink rub resistance with blends of NCC on polyethylene film

| 20 parts NCC-80 parts poly(vinyl alcohol) | | | 20 parts NCC-80 parts ethylene-acrylic acid copolymer | | | 20 parts NCC-80 parts styrene-acrylonitrile latex | | |
|---|---|---|---|---|---|---|---|---|
| Black print density- higher is better | % Black flexo ink removed- dry rub-lower is better | % Black flexo ink removed- wet rub- lower is better | Black print density- higher is better | % Black flexo ink removed- dry rub-lower is better | % Black flexo ink removed- wet rub- lower is better | Black print density- higher is better | % Black flexo ink removed- dry rub-lower is better | % Black flexo ink removed- wet rub- lower is better |
| 1.03 ± 0.03 | 0.056 ± 0.048 | 44 ± 11 | 1.05 ± 0.03 | 0.030 ± 0.004 | 0.09 ± 0.07 | 1.01 ± 0.03 | 0.34 ± 0.08 | 0.12 ± 0.05 |

Example 14—Illustration that the Wet Rub Resistance of Flexographic Ink can be Controlled by Varying the Ratio of CNC to EAA Polymer FIG. 8 shows images of the wet rub resistance as a function of the proportion of CNC to EAA in the coating. FIG. 8 illustrates that wet rub resistance can be controlled by varying the ratio of CNC to EAA in the coating. This is shown quantitatively in Table 11.

TABLE 11

Varying the resistance of the flexographic ink to wet rub, as a function of the ratio of CNC to EAA polymer.

|  | Extent of wet rub. Lower is better. |
|---|---|
| Control plastic (uncoated) | 0.24 |
| Pure EAA (ethylene acrylic acid copolymer) coating | 1.22 |
| Coating with 50 parts CNC and 50 parts EAA | 3.00 |
| Coating with 80 parts CNC and 20 parts EAA | 30.8 |

Example 15—Illustration of Faster Drying of Water-Based Flexographic Inks with Increasing Content of CNC in the Coating Layer FIG. 9 shows images of improved ink drying rate with increasing content of CNC in the coating layer. Ink drying is very slow (high ink setoff) for the control uncoated polymer film and for a coating of pure EAA polymer and a blend of 20% CNC/80% EAA. Ink drying is improved at 80% CNC/20% EAA. This is shown quantitatively in Table 12.

TABLE 12

Improvement in flexographic ink drying (reduction in ink setoff) with increased CNC content in the coating layer on polyethylene film

|  | Blackness of the ink setoff print. Lower is better. |
|---|---|
| Control plastic (uncoated) | 84.0 |
| Pure EAA (ethylene acrylic acid copolymer) coating | 92.7 |
| Coating with 60 parts CNC and 40 parts EAA | 1.3 |

Figure 10A:
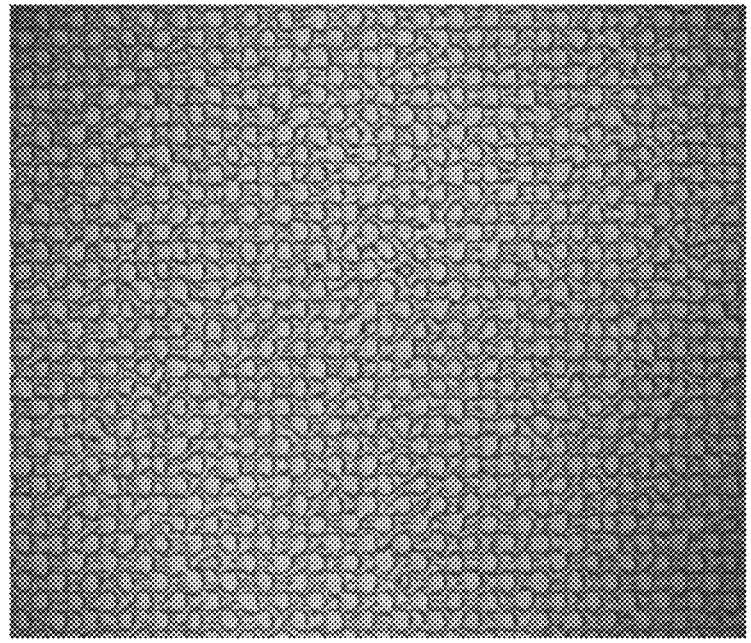
FIG. 10A illustrates a halftone dot pattern of 75% nominal coverage printed with conventional water-based flexographic packaging ink on untreated PET film of the prior art.
Figure 10B:
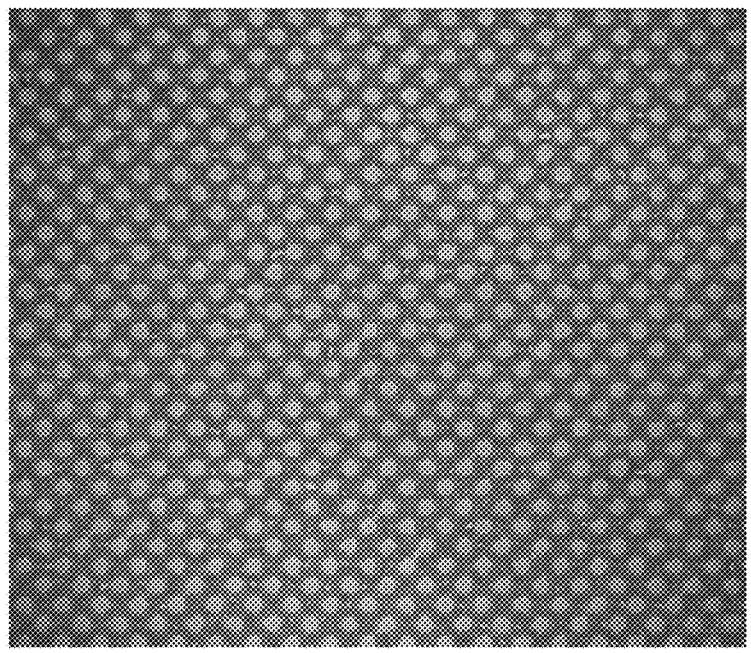
FIG. 10B shows the superior image quality of a halftone dot pattern of 75% nominal coverage printed with conventional water-based flexographic packaging ink on PET film coated with a blend of CNC with PVOH, according to one embodiment of the present invention, showing an improvement in halftone dot quality when printing with water-based flexographic ink on a thin CNC coating.

Example 16—Illustrations of Improved Flexographic Halftone Dot Print Quality by Means of a Thin Coating of CNC FIG. 10 illustrates the improved print quality of halftone dots printed on PET film. The area printed is a nominal 75% halftone dot area; that is, an area that is meant to be 75% covered by ink, and 25% unprinted. We see in FIG. 10A that the dots on the untreated PET film are poorly formed. In FIG. 10B, we see that the individual dots are sharp and well-resolved when printed on a thin CNC coating on the PET film.

Example 17—Reduction in the Oxygen Transmission (OTR) Rate Using Thin Coatings of CNC A thin coating of CNC plus EAA reduces the oxygen transmission rate (OTR) of a polyethylene film. The benefits largely derive from the CNC content in the thin coating. As shown in Table 13, the OTR of the polyethylene film is somewhat reduced by a thin containing 20% CNC and 80% EAA. The OTR is much further reduced by a coating containing 80% CNC and 20% EAA. As also shown in Table 13, the normalized OTR is far lower with 80% CNC in the coating, compared to the coating containing 20% CNC or to the untreated polymer film.

TABLE 13

Reduction in OTR (Oxygen Transmission Rate) on LLDPE (Linear Low Density Polyethylene Film) with thin coatings of CNC. Lower value is better.

|  | OTR, cc/day | OTR (cc-100 μm/m2/day); normalized to 100 μm film thickness |
|---|---|---|
| Linear LDPE film; untreated | 7.5 | 7.7 |
| Coating with 20 parts CNC and 80 parts EAA (ethylene acrylic acid copolymer); 3.1 μm | 6.2 | 1.2 |
| Coating with 80 parts CNC and 20 parts EAA, 5.3 μm | 1.2 | 0.08 |

REFERENCES http://www.census.gov/, accessed Apr. 27, 2011.

Hamada, H. and Bousfield, D. W., Nanofibrillated cellulose as a coating agent to improve print quality on synthetic fiber sheet, 11th TAPPI Advanced Coating Fundamentals Symposium, Munich, October, 2010.

Hamada, H., Beckvermit, J., and Bousfield, D. W., Nanofibrillated Cellulose with Fine Clay as a Coating Agent to Improve Print Quality, Paper presented at Papercon 2010, TAPPI Press Atlanta 2010.

Zou, X. Production of nanocrystalline cellulose and its potential applications in specialty papers, Presented at Specialty Papers 2010, Chicago, Nov. 10-11, 2010. PIRA, Leatherhead, UK.

Burwasser, H., Inkjet recording transparency, U.S. Pat. No. 4,474,850, Oct. 2, 1984, Assigned to Transcopy Inc.

Bedell, S. F. and Viola, M. S., Ink jet transparency, U.S. Pat. No. 4,547,405, Oct. 15, 1985; Assigned to Polaroid Corporation.

Light, W. A., Inkjet transparency, U.S. Pat. No. 5,126,194, Jun. 30, 1992, Assigned to Eastman Kodak Co.

Schad, B. and Van Ness, E., Food grade dry film coating composition and methods of making and using the same, World Intellectual Property Organization WO 2011/112618, Sep. 15, 2011, Assigned to Sensient Colors Inc.

http://www.surface-tension.de/solid-surface-energy.htm; accessed Sep. 28, 2011.

http://www.rubtester.com/index.html, Accessed Nov. 4, 2011.

Skowronski, J. and Bichard, W., Fiber-to-Fiber Bonds in Paper. (1). Measurement of Bond Strength and Specific Bond Strength, J. Pulp Paper Sci. 13:J165 (1987).

Aspler, J. S., Newsprint requirements for water-based flexography, Part III: Influence of newsprint properties on flexo ink holdout, J. Pulp Paper Sci. 14:J66 (1988).

The invention claimed is:

1. A coating composition for a polymer recording medium, the coating comprising:
   a cellulose nanocrystal (CNC), and
   a polymeric material compatible with CNC,
   wherein the coating has a weight ratio of polymeric material (PM) to CNC from 20% to 80% PM/CNC.

2. The composition according to claim 1, wherein the polymeric material is selected from a polyvinyl alcohol, an ethylene vinyl acetate (EVA) copolymer, an ethylene acrylic acid (EAA) copolymer, a carboxylated latex and combinations thereof.

3. The composition according to claim 1, wherein the weight ratio of polymeric material (PM) to CNC is from 20% to 25% PM/CNC.

4. The composition of claim 1, wherein the polymer recording medium is treated in a corona discharge.

5. The composition of claim 4, wherein the corona discharge is in a range from 5 to 25 W min/m$^2$.

6. The composition of claim 1, wherein said composition is dry coated to a weight of 3 g/m$^2$ on the polymer recording medium.

7. The composition according to claim 1, wherein the weight ratio of polymeric material (PM) to CNC is from 20% to 40% PM/CNC.

* * * * *